United States Patent [19]

Okano

[11] Patent Number: 4,506,313
[45] Date of Patent: Mar. 19, 1985

[54] TIME AXIS CORRECTION DEVICE FOR A SIGNAL REPRODUCED FROM A RECORDING MEDIUM

[75] Inventor: Takashi Okano, Tokorozawa, Japan

[73] Assignee: Pioneer Video Corporation, Tokyo, Japan

[21] Appl. No.: 407,624

[22] Filed: Aug. 12, 1982

[30] Foreign Application Priority Data

Aug. 13, 1981 [JP] Japan .................. 56-126880

[51] Int. Cl.³ .......................................... H04N 9/493
[52] U.S. Cl. .................................. 358/320; 360/36.1
[58] Field of Search .............. 358/320, 148; 360/36.1; 328/155, 162

[56] References Cited

U.S. PATENT DOCUMENTS

| | | | |
|---|---|---|---|
| 3,624,274 | 11/1971 | Araki | 358/320 |
| 3,659,040 | 4/1972 | Fujita | 358/320 |
| 4,376,291 | 3/1983 | Heitmann | 358/320 |
| 4,415,935 | 11/1983 | Suzuki | 358/320 |

Primary Examiner—Michael A. Masinick
Attorney, Agent, or Firm—Fleit, Jacobson, Cohn & Price

[57] ABSTRACT

A time axis correction device for treating a signal having a time axis fluctuation, such as a color video signal reproduced from a video disc, includes a phase modulation network whose phase transmission characteristic is dependent on the phase error of the input signal while the amplitude transmission characteristic is constant.

2 Claims, 4 Drawing Figures

TIME AXIS CORRECTION DEVICE FOR A SIGNAL REPRODUCED FROM A RECORDING MEDIUM

BACKGROUND OF THE INVENTION

1. Field of the Invention

The present invention relates to a time axis correction device for a signal having a time axis fluctuation such as a signal reproduced from a recording medium.

2. Description of the Prior Art

A signal reproduced from a recording medium such as a signal readout from a video disc or a video tape is generally accompanied by a time axis fluctuation. In the case of a signal carrying color video information, for example, such a fluctuation causes jitter or color shading on the reproduced color image.

In order to reduce the time axis fluctuation, various types of time axis correction devices have been proposed. A variable delay element such as a charge coupled device (CCD), for example, has been used in a video disc player system (VDP). The charge coupled device, however, requires a high frequency pulse drive signal and a plurality of peripheral circuits. Furthermore, a shield member has to be used to prevent the undesirable radiation of high frequency pulse drive signals. In addition, there is a further drawback in that a crosstalk component of time axis correction signals appears at the output video signal.

In the case of a video disc player system, a tangential actuator is provided for controlling the position of pickup spot or point along a tangent of recording track, and a control loop system is used for driving the tangential actuator. Such a type of control system adopts a closed servo loop operation in order to make the sensitivity thereof constant, so that the control system has degraded responsiveness in the high frequency range.

Furthermore, the so called heterodyne system has been adopted in video tape recorder systems. The heterodyne system, however, had drawbacks such that the circuit construction tends to be complicated due to a plurality of peripheral circuits, and such that the separation of chroma signals, which may deteriorate the bandwidth characteristics of a luminance signal and the chroma signal, is necessary.

SUMMARY OF THE INVENTION

An object of the present invention, therefore, is to provide a time axis correction device of relatively simple structure, having broad bandwidth characteristics.

Another object of the present invention is to provide a time axis correction device which is free from the undesirable radiation of high frequency signals.

According to the present invention, the time axis correction device comprises a phase modulation transmission network including a variable impedance element whose impedance is varied in accordance with the magnitude of the fluctuation of the time axis of an input signal reproduced from a recording medium. The reproduction signal is transferred through the phase modulation transmission network whose phase transmission characteristics are dependent upon the impedance of the variable impedance element, while the amplitude transmission characteristic thereof is constant. Thus the phase error of the input signal is compensated for by the time axis correction device of a rather simple construction.

The foregoing and other objects and advantages of the present invention will become more clearly understood from the following description taken in conjunction with the accompanying drawings.

DETAILED DESCRIPTION OF THE PREFERRED EMBODIMENT

Figure 1:
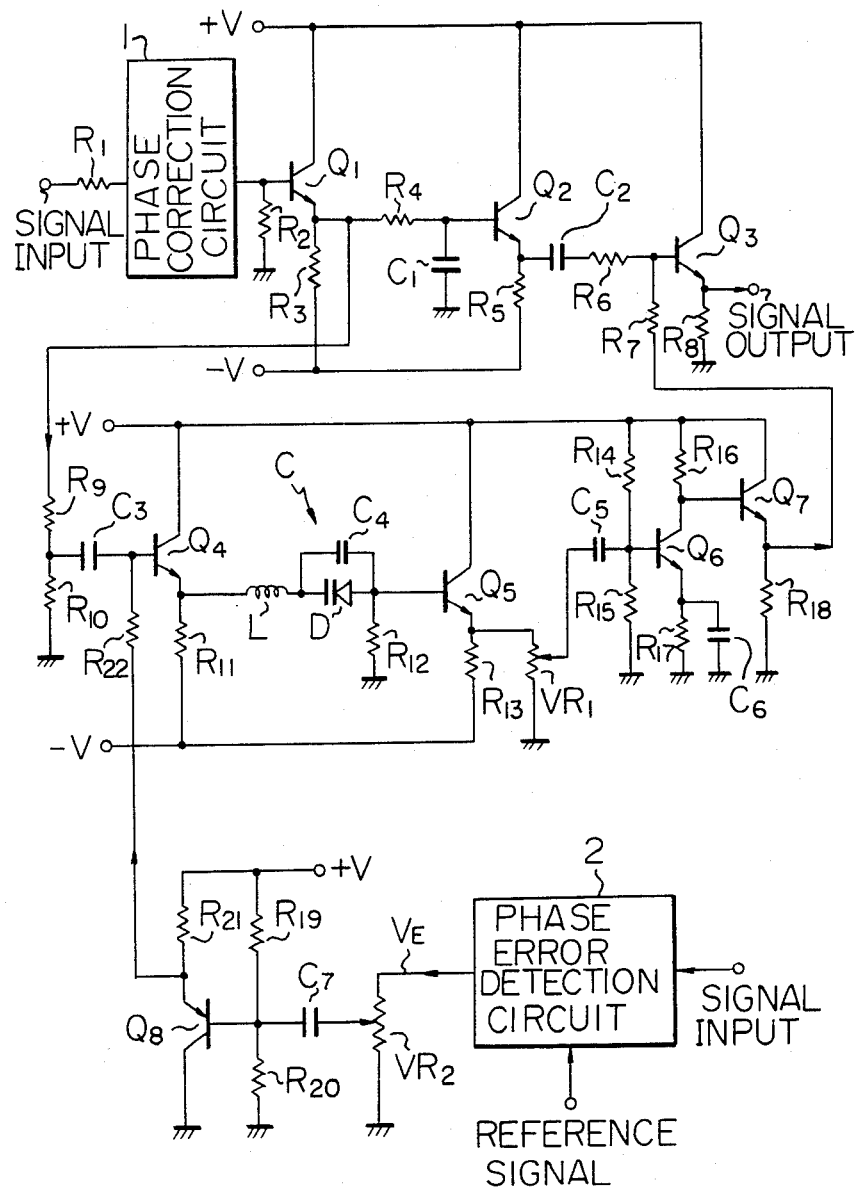
FIG. 1 is a circuit diagram of an embodiment of the time axis correction device according to the present invention.

Reference is first made to FIG. 1, wherein the circuit diagram of an embodiment of the time axis correction device according to the present invention is illustrated.

The device comprises a phase correction circuit 1 which receives, through an impedance matching resistor $R_1$, an input signal having time axis fluctuation such as a color video signal from a video tape player or a video disc player. The phase correction circuit 1 has a phase transfer characteristic suitable for compensating for the group delay characteristics of circuits of the following stages, as mentioned after, i.e., reverse characteristics of the group delay characteristics.

An output signal of the phase correction circuit 1 is applied to the base of a transistor $Q_1$ at which an impedance matching resistor $R_2$ is connected. An output signal of the transistor $Q_1$ is applied, at the emitter thereof, to the base of a transistor $Q_2$ through a delay circuit of a resistor $R_4$ and a capacitor $C_1$.

The transistor $Q_2$ produces an output signal at the emitter thereof which is applied to the base of a transistor $Q_3$ via a coupling capacitor $C_2$ and a resistor $R_6$. An output signal of the device is obtained at the emitter of the transistor $Q_3$.

As seen from the foregoing, the transistors $Q_1$ through $Q_3$ operate as emitter follower circuits, and resistors $R_3$, $R_5$ and $R_8$ are the emitter resistors thereof.

The output signal of the transistor $Q_1$ is applied to a series connection of resistors $R_9$ and $R_{10}$ which form a voltage divider circuit for reducing the voltage level of the output signal of the transistor $Q_1$ by approximately one-half. At the junction of the resistors $R_9$ and $R_{10}$, there is connected the base of a transistor $Q_4$ through a coupling capacitor $C_3$.

An output signal of the transistor $Q_4$ at the emitter thereof is supplied to a phase modulation transmission network comprising a coil L, a varactor diode D, a capacitor $C_4$ connected thereto, and a resistor $R_{12}$ connected to ground. The phase and amplitude characteristics of the input signal are controlled in accordance with the variable impedance (the variable reactance) of the varactor diode D.

The output signal of the transmission network is applied to the base of a transistor $Q_5$ whose emitter is connected to a variable resistor $VR_1$. Through the variable resistor $VR_1$, an output signal of the transistor $Q_5$ is applied to an inverter circuit including transistors $Q_6$ and $Q_7$ at a suitable level.

The output signal of the inverter circuit, i.e., the output signal of the transistor $Q_7$, is applied, through a resistor $R_7$, to the base of the transistor $Q_3$ at which the output signal of the inverter circuit is additively mixed with the output signal of the transistor $Q_2$. Resistors $R_{11}$, $R_{13}$, $R_{17}$ and $R_{18}$ are the emitter resistors of the respective transistors $Q_4$, $Q_5$, $Q_6$, and $Q_7$ and the transistors $Q_5$, $Q_6$ and $Q_7$ operate as emitter follower circuits. Resistors $R_{14}$ and $R_{15}$, connected to the base of the transistor $Q_6$, are the bias resistors thereof, and resistor $R_{16}$ is a collector resistor thereof. A capacitor $C_6$ is connected in parallel to the resistor $R_{17}$ for the purpose of bypass operation.

A phase error detection circuit 2 is provided for detecting the time axis fluctuation, i.e., the phase error of the input signal such as the color video signal. The phase error detection circuit 2 is arranged such that a phase error signal $V_E$ is produced by comparing the phase of a color burst signal contained in the color video signal with the phase of a reference signal. An example of a phase error detection circuit is disclosed in Japanese patent application No. 54-88848 (Provisional Publication No. 56-13884), filed on July 12, 1979, (U.S. Pat. No. 4,415,935) incorporated herein by reference thereto.

The phase error signal $V_E$ is applied to the base of a transistor $Q_8$ through a variable resistor $VR_2$ and a capacitor $C_7$. The output signal of the transistor $Q_8$, produced at the emitter thereof, is applied to the base of the transistor $Q_4$ via a resistor $R_{22}$ as an inverse bias control voltage of the varactor diode D. Resistors $R_{19}$ and $R_{20}$ are used as base bias resistors of the transistor $Q_8$.

The operation of the device will be mathematically explained hereinafter.

The transmission characteristic $F_1(j\omega)$ of a circuit portion from the base of the transistor $Q_4$ through the emitter of the transistor $Q_5$ is expressed as follows:

$$F_1(j\omega) = \frac{R}{j\omega L + \frac{1}{j\omega C} + R} = \frac{j\omega CR}{1 - \omega^2 LC + j\omega CR} \quad (1)$$

wherein R is a resistance value of the resistor $R_{12}$ and C is a combined capacitance value of the capacitor $C_4$ and the varactor diode D.

If the resistance values of the resistors $R_6$ and $R_7$ are selected to be equal, then attenuation factors of the output signals of the transistors $Q_2$ and $Q_7$ are approximately one half. Furthermore, if the resistance value of the variable resistor $VR_1$ and the gain of the inverter amplifier (transistors $Q_6$ and $Q_7$) are adjusted so that the voltage gain of a circuit portion from the emitter of the transistor $Q_1$ through the emitter of the transistor $Q_7$ is approximately twice, the transmission characteristic $F(j\omega)$ of the device (from the emitter of the transistor $Q_1$ through the emitter of the transistor $Q_3$) is expressed as follows:

$$F(j\omega) = \tfrac{1}{2}\{1 - 2F_1(j\omega)\} \quad (2)$$

The equation (2) is rewritten by means of the equation (1) as follows:

$$F(j\omega) = \tfrac{1}{2}\left(\frac{(1 - \omega^2 LC) - j\omega CR}{(1 - \omega^2 LC) + j\omega CR}\right) \quad (3)$$

The amplitude transmission characteristic $F(j\omega)$ is therefore expressed as follows:

$$|F(j\omega)| = \tfrac{1}{2}\left\{\frac{\sqrt{(1 - \omega^2 LC) + (-\omega CR)^2}}{\sqrt{(1 - \omega^2 LC)^2 + (\omega CR)^2}}\right\} = \tfrac{1}{2} \quad (4)$$

Thus, the amplitude transmission characteristic of the device is made constant independent of the impedance value of the phase modulation network, especially the impedance value of the varactor diode D.

The phase transmission characteristic $<F(j\omega)$ of the device is expressed as follows:

$$\angle F(j\omega) = -2\tan^{-1}\left(\frac{\omega CR}{1 - \omega^2 LC}\right) \quad (5)$$

It will be seen that the phase transmission characteristic is varied in accordance with the impedance value of the varactor diode D. The inductance value of coil L and the resistance value of the resistor R are constant.

Thus, the phase error of the input signal (color video signal) is compensated for in accordance with the impedance value of the varactor diode, which is varied with the error amount of the time axis of the input signal.

In addition, the operating voltage of the varactor diode D is determined by the voltage level divided by the combined value of resistors $R_{19}$ and $R_{20}$. Furthermore, the temperature characteristic is automatically compensated for by the use of a pair of NPN and PNP transistors $Q_4$ and $Q_8$ so that the changes of the base-emitter voltage ($V_{BE}$) levels of respective transistors are cancelled.

In order to obtain a precise operation of the time axis correction device, it is necessary that there be a linear relation between the angle of phase modulation $<F(j\omega)$ shown by the equation (5) and the phase error signal.

Figure 3:
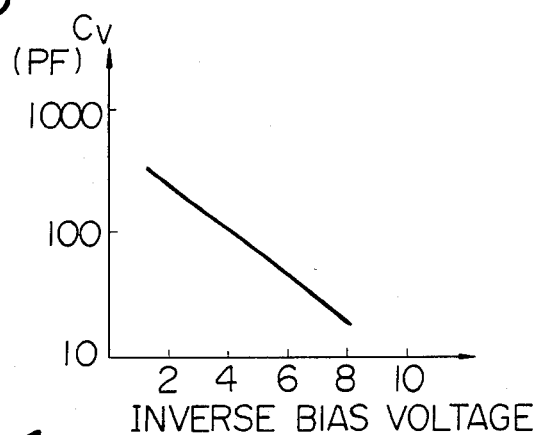
FIG. 3 is a graph showing the relationship between the capacitance $C_v$ of the varactor diode and the value of an inverse bias voltage applied thereto.

FIG. 3 shows a relationship between the capacitance value $C_v$ of the varactor diode D and the level of the inverse bias voltage, where the inductance value of coil L, the resistance of the resistor $R_{12}$, and the capacitance of the capacitor $C_4$ are selected to be 10 $\mu$H, 120$\Omega$ and 100 PF, respectively. As shown in the figure, the capacitance value $C_v$ of the varactor diode D varies linearly with the inverse bias voltage.

Figure 2:
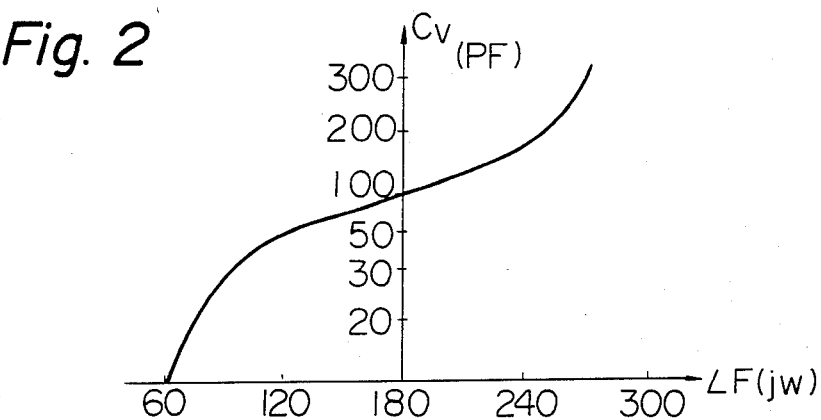
FIG. 2 is a graph showing the relationship between the capacitance $C_v$ of a varactor diode used in the circuit shown in FIG. 1 and an angle of phase modulation $<F(j\omega)$.

The relationship between the capacitance value $C_v$ and the angle of phase modulation $<F(j\omega)$ at the frequency of 3.58 (color subcarrier frequency in NTSC system) MHz under the conditions described above is shown in FIG. 2. As shown, the angle of phase modulation $<F(j\omega)$ varies linearly with the capacitance value $C_v$ within the specific range of the phase modulation angle $<F(j\omega)$.

As seen from the equation (5), the phase transmission characteristics of the device depend on the frequency of the input signal, and the group delay frequency characteristics of the device are not constant. The device, therefore, is provided with a phase correction circuit 1 as described previously.

In addition, the resistors $R_9$ and $R_{10}$, connected to the base of the transistor $Q_4$, are used to reduce sufficiently the input signal level relative to the control voltage applied to the varactor diode D so as to prevent distortion of the output signal.

Figure 4:
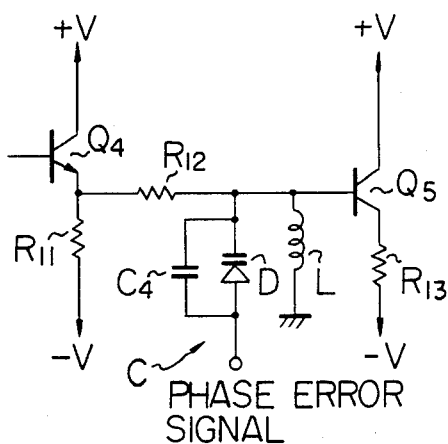
FIG. 4 is a circuit diagram showing a portion of the cirucuit of a modification of the embodiment shown in FIG. 1.

FIG. 4 shows another example of a phase modulation transmission network. As shown, the parallel circuit of the varactor diode D and the capacitor $C_4$ is connected to a junction of the base of the transistor $Q_5$ and the resistor $R_{12}$ which is connected to the emitter of the transistor $Q_4$. The coil L is connected to the base of the transistor $Q_5$ and ground. This circuit arrangement provides the same function as does the circuit shown in FIG. 1.

An application of the time axis correction device described in the above, to a video disc player system (VDP), will be explained hereinafter.

In the case of a video disc player system, a tangential actuator is used for compensating for the time axis variation of a large magnitude, and therefore a color video signal having a residual time axis fluctuation or a residual phase error is treated by the time axis correction device. Without using the time axis correction device, the color image obtained by the output signal of the video disc player system is almost free from fluctuation of the image due to the operation of the tangential actuator control. However, the hue fluctuation is not eliminated due to the residual phase error of the video signal.

It is preferred in a video disc player to utilize the time axis correction device of the present invention while using the color burst signal as the reference signal in order to perform time axis correction of a reproduced signal and to perform the tangential servo on the basis of the H sync pulses.

When the time axis correction device is used for treating such a video signal, it is sufficient to adjust the value of the variable resistor $VR_2$ in response to the magnitude of the time axis fluctuation.

Furthermore, instead of the composite video signal, only a chroma signal can be used as the input signal of the time axis correction device.

It will be appreciated from the foregoing that according to the time axis correction device of the present invention, the phase transmission characteristics of the circuit are solely varied by the variable impedance element without causing deterioration of the amplitude transmission characteristics of the circuit. Furthermore, the device has various advantages such that the circuit arrangement is rather simple, and the cost of manufacturing is reduced. In addition, the response speed of the phase modulation circuit is fast and the phase modulation characteristics are stable against the phase error amount; therefore, the device is quite suited for suppressing the high frequency time axis fluctuation which cannot be treated by the prior art devices having a closed loop servo system. Moreover, the device is applicable to various systems for treating signals since the device does not cause undesirable radition of high frequency waves.

Above, preferred embodiments of the present invention have been described. It should be understood, however, that the foregoing description has been for illustrative purposes only, and is not intended to limit the scope of the invention. Rather, there are numerous equivalents to the preferred embodiment. As only one of many examples, the inductance L and the resistance R as the parameters in the equation (5) can be made variable.

What is claimed is:

1. A time axis correction device for treating an input signal having time axis fluctuation, comprising:
    an error signal generation means for generating an error signal corresponding to the magnitude of an error of the time axis of the input signal;
    a phase modulation means responsive to said error signal for treating the input signal, comprising a phase modulation transmission network including a variable impedance element whose impedance is varied with said error signal, the phase transmission characteristic of said phase modulation means being dependent on the impedance of said variable impedance element;
    a first amplifier for receiving said input signal;
    a second amplifier for inverting the output signal of said phase modulation means; and
    a mixer means for additively mixing the output signals of said first and second amplifiers.

2. A time axis correction device as recited in claim 1, further comprising a phase correction means for compensating for group delay frequency characteristics of said phase modulation transmission network.

* * * * *